(12) United States Patent
Town et al.

(10) Patent No.: US 8,339,928 B2
(45) Date of Patent: Dec. 25, 2012

(54) SINGLE-SIDED PRE-RECORDED DUAL-LAYER DVD DISC FUNCTIONING AS A DUAL-SIDED PRE-RECORDED DVD

(75) Inventors: John Matthew Town, Ojai, CA (US); Mark Timothy Turnage, Denver, CO (US)

(73) Assignees: Thomson Licensing, Boulogne-Billancourt (FR); OPSEC Security Group, Inc., Denver, CO (US)

( * ) Notice: Subject to any disclaimer, the term of this patent is extended or adjusted under 35 U.S.C. 154(b) by 277 days.

(21) Appl. No.: 12/312,205

(22) PCT Filed: Nov. 15, 2007

(86) PCT No.: PCT/US2007/024032
§ 371 (c)(1),
(2), (4) Date: Apr. 29, 2009

(87) PCT Pub. No.: WO2008/060606
PCT Pub. Date: May 22, 2008

(65) Prior Publication Data
US 2010/0061221 A1 Mar. 11, 2010

Related U.S. Application Data

(60) Provisional application No. 60/859,097, filed on Nov. 15, 2006.

(51) Int. Cl.
*G11B 7/24* (2006.01)

(52) U.S. Cl. .................. 369/275.3; 369/275.4; 369/283

(58) Field of Classification Search ............... 369/275.3, 369/111, 275.4, 286, 280, 283, 44.26, 277, 369/278, 279, 275.1
See application file for complete search history.

(56) References Cited

U.S. PATENT DOCUMENTS

| | | | |
|---|---|---|---|
| 5,764,621 A | | 6/1998 | Choi |
| 5,881,032 A | * | 3/1999 | Ito et al. ...................... 369/30.1 |
| 7,126,906 B2 | * | 10/2006 | Iida ............................ 369/275.3 |
| 2001/0013269 A1 | | 8/2001 | Tanji |

(Continued)

FOREIGN PATENT DOCUMENTS

CN 1151071 6/1997

(Continued)

OTHER PUBLICATIONS

Nathans S F: "Building and Burning Dual Layer DVD" Internet Citation, [ Online] Apr. 12, 2004, XP002385644 Retrieved from the internet: URL: http//www.ernedialive.com/Articles/PrintArticle.aspx?ArticleID=8421> [retrieved on Jun. 15, 2006].

*Primary Examiner* — Ali Neyzari
(74) *Attorney, Agent, or Firm* — Robert D. Shedd; Patricia A. Verlangier

(57) ABSTRACT

An optical disc structure for playback by a read-out device is described. The optical disc structure includes a first layer with first content recorded thereon. A second layer is coupled to the first layer. The second layer has first content and second content recorded thereon. The disc of the present principles makes use of the fact that a less than full capacity DVD9 disc leaves available recording space after the end of program area and required lead-out area on the second of the two data layers of a DVD9 disc.

8 Claims, 3 Drawing Sheets

U.S. PATENT DOCUMENTS

| | | |
|---|---|---|
| 2002/0097648 A1 | 7/2002 | Ilda |
| 2007/0047398 A1 | 3/2007 | Yamamoto |
| 2008/0267035 A1 | 10/2008 | Kuroda et al. |
| 2008/0310278 A1 | 12/2008 | Brondijk |
| 2009/0231986 A1 | 9/2009 | Tanikawa |

FOREIGN PATENT DOCUMENTS

| | | |
|---|---|---|
| EP | 0817195 | 1/1998 |
| EP | 1758117 | 2/2007 |
| JP | 01154329 | 6/1989 |
| JP | 09017052 | 1/1997 |
| JP | 10021673 | 1/1998 |
| JP | 11328737 | 11/1999 |
| JP | 2001216765 | 8/2001 |
| JP | 2002251746 | 9/2002 |
| JP | 200759021 | 3/2007 |
| JP | 2009518771 | 5/2009 |
| WO | WO03038823 | 5/2003 |
| WO | WO2005001823 | 1/2005 |
| WO | WO2005020231 | 3/2005 |
| WO | WO2005093726 | 6/2005 |
| WO | WO2006118146 | 9/2006 |
| WO | WO2007066263 | 6/2007 |

\* cited by examiner

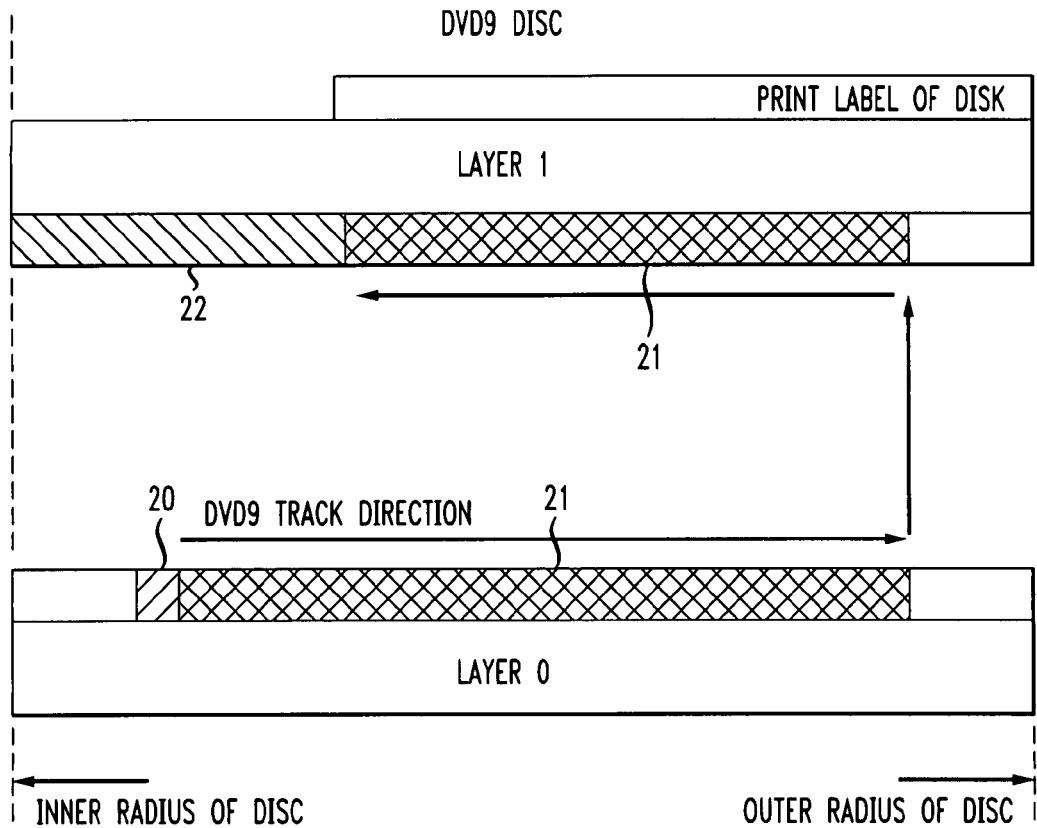
FIG. 2
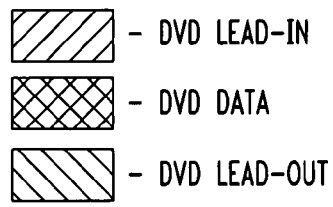
PRIOR ART

SINGLE-SIDED PRE-RECORDED DUAL-LAYER DVD DISC FUNCTIONING AS A DUAL-SIDED PRE-RECORDED DVD

CROSS-REFERENCE TO RELATED APPLICATIONS

This application claims the benefit, under 35 U.S.C. §365 of International Application PCT/US2007/024032, filed Nov. 15, 2007 which was published in accordance with PCT Article 21(2) on May 22, 2008 in English and which claims the benefit of U.S. provisional patent application No. 60/859,097 filed Nov. 15, 2006.

TECHNICAL FIELD

This invention relates to an optical storage device, such as, a digital versatile disk (DVD).

BACKGROUND ART

DVD discs feature one or two data layers readable from one or two sides of the disc. The majority of pre-recorded DVD discs feature two data layers: single-layer discs where the data layers are singularly read from one side (DVD5) or both sides (DVD10) of the disc and dual-layer discs (DVD9) where two data layers are read from one side of the disc.

Referring to FIG. 1 there is shown a cross-section of a DVD5 type disc. For such a disc, DVD data is recorded on a portion 11 of data Layer 0 with lead-in data 10 and lead out data 12 recorded on either end thereof. A cross-section of a DVD9 type disc is shown in FIG. 2. For the DVD9 disc DVD data is recorded on portions 21 of data Layer 0 and data Layer 1. Lead in data 20 is recorded on data Layer 0 and lead out data 22 is recorded on data Layer 1.

DVD9 discs typically feature one volume or title described by the disc's "Control Data" which acts as a table of contents or description of the disc. DVD10 discs allow two separate disc volumes to be created on one disc, each readable separately and discretely by turning the disc over in a drive. However, single-layer discs are limited to 4.7 GB per side. If a publisher wishes to record two volumes or titles on one disc that total less than 8.5 GB but where one of the volumes is greater than 4.7 GB the current DVD technology does not accommodate this.

BRIEF SUMMARY OF THE INVENTION

This disc of the present principles acts as a single-sided pre-recorded dual-layer DVD disc (DVD9) but also functions as a dual-sided pre-recorded DVD disc that can be read from both sides of the disc by a DVD player/drive. The present invention provides an optical disc structure for playback by a read-out device. The optical disc structure includes a first layer with first content recorded thereon. A second layer is bonded to the first layer. The second layer has first content and second content recorded thereon. The disc of the present principles makes use of the fact that a less than full capacity DVD9 disc leaves available recording space after the end of program area and required lead-out area on the second of the two data layers of a DVD9 disc.

BRIEF SUMMARY OF THE DRAWINGS

FIG. 2 depicts a cross-section of a DVD9-type disc in accordance with the prior art.

DETAILED DESCRIPTION

Figure 1:
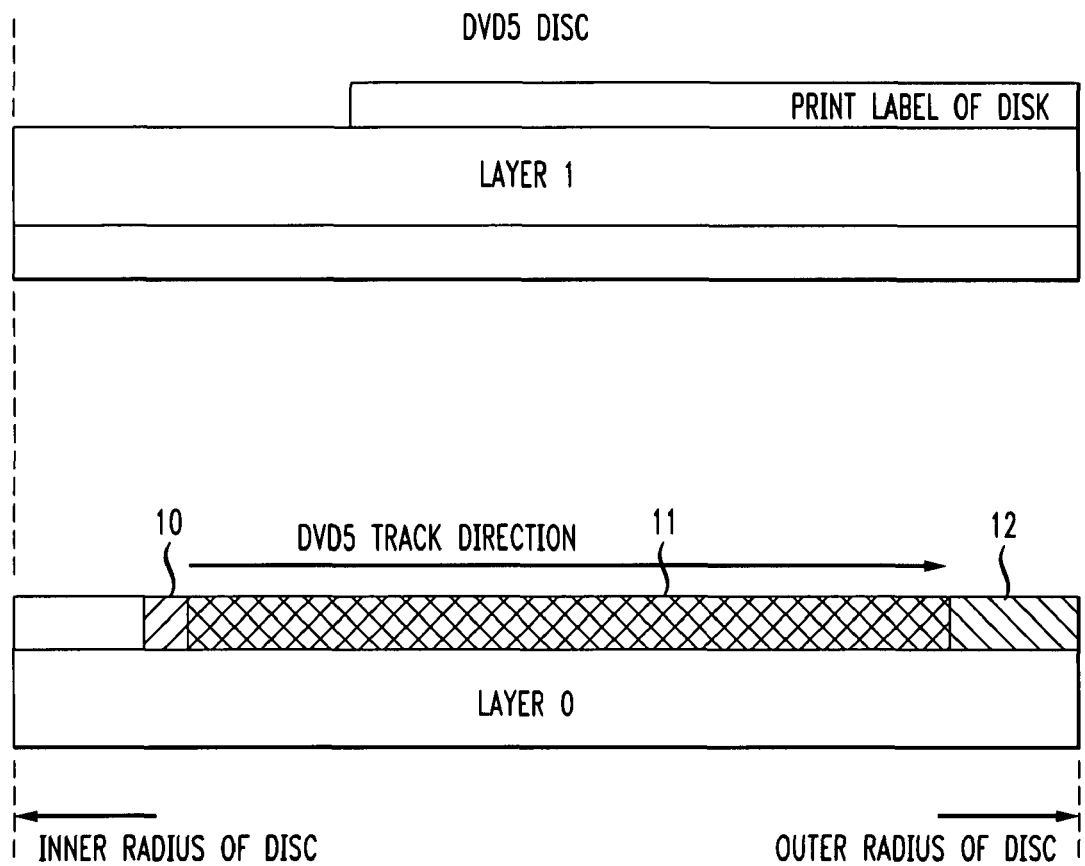
FIG. 1 depicts a cross section of a DVD5-type disc in accordance with the prior art.

This disc of the present principles acts as a single-sided pre-recorded dual-layer DVD disc (DVD9) but also functions as a dual-sided pre-recorded DVD disc that can be read from both sides of the disc by a DVD player/drive. The disc of the present principles makes use of the fact that a less than full capacity DVD9 disc leaves available recording space after the end of program area and required lead-out area on the second of the two data layers of a DVD9 disc.

The DVD9 disc structure is comprised of two data layers recorded on two similar plastic substrates bonded together. DVD specifications typically refer to the two layers as Layer-0 and Layer-1 (FIG. 2). Layer-0 being the first data layer and that closest to the read-out laser in a DVD reading device. Pre-recorded DVD discs are typically recorded on un-grooved photoresist glass masters using Laser Beam Recorders (LBR). The image recorded in photoresist on the glass substrate is then transferred to a nickel disc via electro-forming and replicas of the disc image are injection molded in polycarbonate from the nickel disc master.

Pre-recorded DVD9 discs are recorded as glass masters (and played back) in one of two methods: Opposite Track Path (OTP) and Parallel Track Path (PTP). In the case of OTP discs, the Layer-0 is recorded from inner to outer diameter and the Layer-1 is recorded from outer to inner diameter (FIG. 2). An OTP DVD9 disc requiring less than the full 8.4 GB design capacity allowed by the format ends its program area on Layer-1 before the recording has reached the inner diameter of the disc and then requires the specified 0.5 mm radius of lead-out data. In practice, lead-out data 22 is continued to the inner diameter of the disc to complete the recording.

With the disc of the present principles, the DVD9 OTP recording is terminated after at least 0.5 mm of lead-out data has been recorded on Layer-1 and the rest of the recording area is left blank. The remaining recording area is then used to record a standard single-layer DVD recording that starts from the inner radius and will be mathematically calculated to end at the same radius the DVD9 OTP Layer-1 terminated called a recording session "transition point." This process requires precise control of the recording device, typically a Laser Beam Recorder, and specially developed techniques to control the recording process. The subsequent disc manufacturing operations post recording of the glass master would be unaffected.

The disc of the present principles creates a property of a pre-recorded DVD disc that is not replicable on a DVD-R disc. This disc of the present principles further creates a single disc with both a dual-layer DVD9 disc volume and a single-layer DVD5 disc volume. The two separate volumes or titles on the disc accessible by reading the disc from both sides offer various security and accessibility advantages that have previously been limited to single-layer dual-sided discs and not possible for the larger dual-layer DVD disc format that dominates the pre-recorded DVD applications.

Laser Beam Recording (LBR) devices used to record the various data layers of DVD discs are typically controlled by programmable systems capable of finely manipulating the recording process. The data signal is supplied by a data formatter and the glass master disc rotation and radial translation are controlled by an LBR system controller that synchronizes the data output of the formatter to the desired location on the disc. Previous optical disc formats have featured "multi-session" recording techniques where the data surface of the glass master is recorded in more than one session or where the nature of the recording has been changed at one or more points of the disc such that the seemingly continuous groove/recorded track is effectively made up of a series of controlled and formatted bands. This is common practice for recording the human readable indicia visible on optical discs at the inner radius prior to start of program area; the practice has also been used to record "high-speed lead-out" to improve LBR utilization, as depicted in FIGS. 1 and 2.

Figure 3:
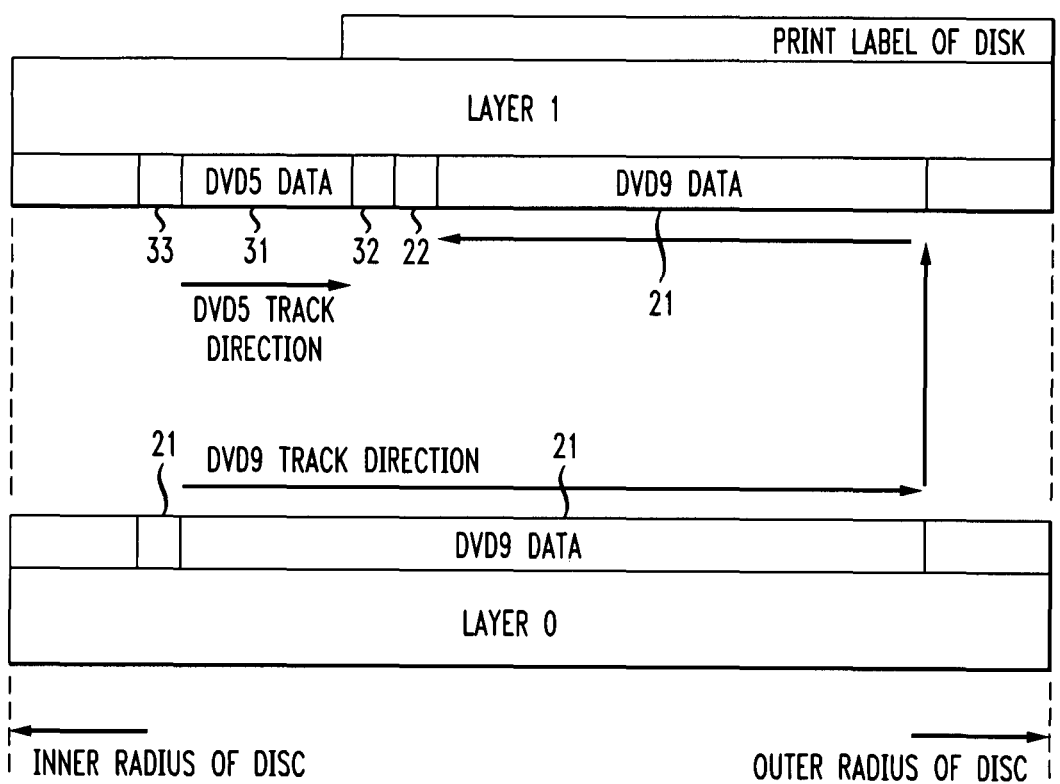
FIG. 3 depicts a cross-section of single-sided pre-recorded dual layer DVD functioning as a dual-sided pre-recorded DVD in accordance with an illustrative embodiment of the present principles.

The disc of the present principles is depicted in FIG. 3 and utilizes the "band recording" technique to record a single-layer DVD volume 31 on the same data surface that holds the reduced capacity Layer-1 dual-layer recording 21. A key difference is that the disc of the present principles shown in FIG. 3 requires a more substantial change to the band recording process in that the single-layer and dual-layer sessions are recorded in different directions of translation across the disc surface and in different directions of disc rotation.

This disc of the present principles possesses a reduced capacity dual-layer DVD9 disc recorded in OTP format with the second (Layer-1) lead-out data 22 minimized to enable the recording of a reduced capacity single-layer DVD5 data image 31 in the available space on the recorded data layer, along with lead-in 33 and lead-out data 32.

The disc format requires that the DVD9 disc image and DVD5 disc image are limited such that the second layer of the DVD9 disc features "shared space" with the DVD5 image up to a combined maximum of approximately 4.0 GB.

The manufacturing of such a disc would require material changes limited to the glass master or disc recording stage. Subsequent electroforming, molding and finishing processes would be unaffected. Label print of the finished disc would need to be designed to fully expose the band of the top surface of the DVD9 disc that contains the DVD5 image data extending in a band from approximately Radius 21 mm to 1 mm radius beyond the end of program.

The glass master recording process would proceed as such:
DVD9 Layer-0 data layer recording would proceed as normal.
DVD9 Layer-1 recording would proceed normally until the end of program area. The LBR formatter or system controller would be programmed to terminate recording after a pre-determined band of lead-out is recorded.
The LBR formatter would then be required to load the single-layer DVD5 image.
The LBR system controller would reverse the rotation sense of the turntable and prepare to record a single-layer DVD5 image at the inner diameter of the glass master.

The single-layer DVD recording would proceed normally and be terminated at a pre-determined radius to coincide with the termination of the previous DVD9 data image. Fine control of this recording process can achieve a seamless visual transition between the two recordings.

The disc of the present principles has security applications related to thwarting anti-counterfeiting attempts using recordable DVD discs. It is known that counterfeit product is widely produced on standard recordable media; publishers could use the fact that the disc in this disc of the present principles would be required to be recorded on two recordable discs versus a single authentic pre-recorded disc.

The principles associated with the disc of FIG. 3 when applied to pre-recorded discs can not be applied to commercial recordable discs. A software application publisher may use the dual-sided nature of the disc to supplement the DVD9 data image with important security information accessible only from a separate disc volume readable from the opposite side of the disc in this disc of the present principles.

The invention claimed is:

1. An optical disc structure for playback by a read-out device, comprising
at least two layers, wherein one layer of the at least two layers has first content and second content recorded thereon, wherein the first content and the second content is recorded along first and second directions, respectively and wherein the first content is read from a first side of the optical disc structure and the second content is read from a second side of the optical disc structure.

2. The optical disc structure of claim 1 wherein the first direction is opposite of the second direction.

3. An optical disc structure for playback by a read-out device, comprising
a first layer coupled to a second layer, wherein one of the first layer and the second layer has first content and second content recorded thereon along first and second directions and wherein the first content is read from a first side of the optical disc structure and the second content is read from a second side of the optical disc structure.

4. The optical disc structure of claim 3 wherein the first content is recorded along a first direction of the first layer.

5. The optical disc structure of claim 4 wherein the first content is recorded along a first direction of the second layer.

6. The optical disc structure of claim 5 wherein the first direction of the first layer is opposite of the first direction of the second layer.

7. The optical disc structure of claim 3 wherein the second content is recorded along a second direction of the second layer.

8. The optical disc structure of claim 7 wherein the first direction of the second layer is opposite of the second direction of the second layer.

* * * * *